(12) United States Patent
Mallis et al.

(10) Patent No.: US 7,527,304 B2
(45) Date of Patent: May 5, 2009

(54) FLOATING WEDGE THREAD FOR TUBULAR CONNECTION

(75) Inventors: David Llewellyn Mallis, The Woodlands, TX (US); Robert S. Sivley, IV, Kingwood, TX (US); Harris A. Reynolds, Jr., Houston, TX (US)

(73) Assignee: Hydril LLC, Houston, TX (US)

( * ) Notice: Subject to any disclaimer, the term of this patent is extended or adjusted under 35 U.S.C. 154(b) by 489 days.

(21) Appl. No.: 11/027,015

(22) Filed: Dec. 30, 2004

(65) Prior Publication Data

US 2006/0145480 A1    Jul. 6, 2006

(51) Int. Cl.
*F16L 15/00*    (2006.01)
(52) U.S. Cl. .................................... 285/390; 285/333
(58) Field of Classification Search ............... 285/390, 285/355, 333, 334, 148.19
See application file for complete search history.

(56) References Cited

U.S. PATENT DOCUMENTS

| | | | |
|---|---|---|---|
| 2,239,942 A | 4/1941 | Stone et al. | |
| 2,992,019 A | 7/1961 | MacArthur | |
| 3,359,013 A | 12/1967 | Knox et al. | |
| 3,989,284 A * | 11/1976 | Blose | 285/332.2 |
| RE30,647 E | 6/1981 | Blose | |
| 4,582,348 A | 4/1986 | Dearden | |
| 4,662,659 A | 5/1987 | Blose et al. | |
| 4,688,832 A | 8/1987 | Ortloff et al. | |
| 4,703,954 A | 11/1987 | Ortloff | |
| 4,822,081 A * | 4/1989 | Blose | 285/334 |
| RE34,467 E | 12/1993 | Reeves | |
| 5,360,239 A | 11/1994 | Klementich | |
| 5,454,605 A | 10/1995 | Mott | |
| 5,462,315 A | 10/1995 | Klementich | |
| 6,009,611 A * | 1/2000 | Adams et al. | 29/407.01 |
| 6,050,610 A | 4/2000 | Enderle | |
| 6,174,001 B1 | 1/2001 | Enderle | |
| 6,206,436 B1 | 3/2001 | Mallis | |
| 6,270,127 B1 * | 8/2001 | Enderle | 285/334 |
| 6,578,880 B2 | 6/2003 | Watts | |
| 6,626,471 B2 * | 9/2003 | Mallis | 285/334 |
| 6,682,101 B2 | 1/2004 | Watts | |
| 6,722,706 B2 | 4/2004 | Church | |

FOREIGN PATENT DOCUMENTS

WO   WO/2004106797   12/2004

* cited by examiner

*Primary Examiner*—Aaron M Dunwoody
(74) *Attorney, Agent, or Firm*—Osha • Liang LLP

(57) ABSTRACT

A tubular connection is provided with a first thread on a first step having an initial makeup location and a second thread on a second step, the second thread being a wedge thread and having a selected clearance on stab and load flanks at the initial makeup location of the first thread.

36 Claims, 9 Drawing Sheets

FLOATING WEDGE THREAD FOR TUBULAR CONNECTION

CROSS-REFERENCE TO RELATED APPLICATIONS

The present application is related to co-pending United States patent applications filed concurrently herewith titled "Threads with Perturbations" Ser. No. 11/027,014, and titled "Pseudo Two-Step Connection" Ser. No. 11/026,512, all assigned to the assignee of the present application and all incorporated herein by reference in their entireties.

BACKGROUND OF INVENTION

1. Field of the Invention

The invention relates generally to threaded tubular joints used in oil and gas well drilling and production, such as tubing, casing, line pipe, and drill pipe, commonly known collectively as oilfield tubular goods. Particularly, the invention relates to a tubular joint for connecting male (pin) and female (box) members by relative rotation and the application of torque for makeup. More particularly, the invention relates to a two-step wedge thread having load flanks, stab flanks, and a positive-stop torque shoulder that will provide a secure and pressure sealed connection between male (pin) and female (box) members of tubular joints without applying excessive torque and work energy for makeup.

2. Background Art

The use of threaded tubular connections for joining flow conduits in an end-to-end relationship to form a continuous flow path for transporting fluid under pressure is well known. One particular use of oilfield tubular members is for drilling a borehole to a desired depth by joining together sections of the tubular members. The joints are intended to support both compression and tension loads, to transmit rotation forces, or torque, from one member to the next, and to seal a passage for pressurized fluid to be transmitted through the interior of the tubular members. Oilfield tubular goods typically use threaded end connections or joints for connecting adjacent sections of conduit, pipe or tubular members. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

In U.S. Pat. No. RE 30,647 by Blose, a particular thread form or structure is disclosed for a tubular connection that provides an unusually strong joint while controlling the stress and strain in connected pin and box members within acceptable levels. The pin member is equipped with at least one generally dovetail-shaped external thread whose width increases in one direction along the pin, while the box member is equipped with at least one matching generally dovetail-shaped internal thread whose width increases in the other direction. In this manner, the mating set of helical threads provide a wedge-like engagement of opposing pin and box flanks that limit the extent of relative rotation between the pin and box members, and define a forcible makeup condition that completes the connection. This is called a "wedge thread." In this wedge thread structure, the flank angles as well as the thread width can be used to control the stress and strain preload conditions induced in the pin and box members for a given makeup torque. Thus, by tailoring the wedge thread structure to a particular application or use, the tubular connection or joint is limited only by the properties of the materials selected.

It will be understood that certain terms are used herein as they would be conventionally understood where tubular joints are being connected in a vertical position along a central axis of the tubular members such as when making up a pipe string for lowering into a well bore. Thus, the term "load flank" designates the side wall surface of a thread that faces away from the outer end of the respective pin or box member on which the thread is formed and supports the weight (i.e., tensile load) of the lower tubular member hanging in the well bore. The term "stab flank" designates the side wall surface of the thread that faces toward the outer end of the respective pin or box member and supports forces compressing the joints toward each other such as the weight of the upper tubular member during the initial makeup of the joint or such as a force applied to push a lower tubular member against the bottom of a bore hole (i.e., compressive force). The term "face" of the box is the end of the box member facing outward from the box threads and the term "nose" of the pin is the end of the pin member facing outward from the threads of the connection. Upon makeup of a connection the nose of the pin is stabbed into and past the face of the box.

As shown in FIG. 1, a single-step prior art connection 10 includes a pin member 11 and a box member 12. Box member 12 has a tapered, internal thread structure 14 formed thereon and adapted for engaging complementary tapered, external thread structure 15 formed on pin member 11 to mechanically secure the box and pin members in a releasable manner.

Internal thread 14 of box member 12 has stab flanks 18, load flanks 16, roots 20, and crests 24. The box thread 14 is a wedge thread that increases in width progressively at a uniform rate in one direction substantially the entire helical length of thread 14. External thread 15 of pin member 11 has stab flanks 19, load flanks 17, roots 21, and crests 25. The pin thread 15 is a wedge thread that increases in width progressively at a uniform rate in the other direction substantially the entire helical length of thread 15. The oppositely increasing thread widths and the taper of the box and pin threads 14 and 15, respectively, cause the complementary flanks, roots, and crests of the respective threads to move simultaneously into forcible engagement during rotational makeup of the connection. The wedge threads may have a rectangular shape cross-section, a dovetail shape cross-section, or another shape continuously along the helical length of the progressively tapered wedge thread. Upon rotational makeup of the connection, surface-to-surface engagement of the threads can provide sealing surfaces that resist the flow of fluids between the threads. In a well formed wedge thread connection a thread seal is provided. An additional seal could be provided at makeup, as for example with a metal-to-metal seal formed by radial interference between overlapping portions of the ends of the connection, as at a tapered portion 26 of the pin member 11 and a tapered internal portion 27 of the box member 12.

The pin member 11 or the box member 12 defines a longitudinal axis 13 of the made up connection 10. The roots and crests of the box and pin members are generally flat and parallel to the longitudinal axis 13 of the connection and have sufficient width to prevent any permanent deformation of the threads when the connection is made up. For example, having a minimum thread width at the root of the thread that is greater than the height of the thread can generally provide adequate shear area to support the flanks under load. A taper is created by the diameter of the roots and crests of the external thread 15 progressively increasing from the nose of the pin member 11 into the connection, and by the diameter of the crest and roots of the internal thread 16 progressively decreasing from the face of box member 12 into the connection.

FIG. 2 shows a prior art two-step wedge thread connection 28. A pin member 29 is in threaded engagement with a box member 30 to form the connection 28 co-axially along a central axis 40. The threads that comprise the connection are separated on two different "steps," a large step indicated by the bracket 31 and a small step indicated by the bracket 32. The crests 33 of the threads in small step 32 of the pin member 29, at their full design height, do not interfere with the crests 32 of the threads in the large step 31 of the box member 30 when the pin member 29 is "stabbed" into the box member 30. The small step 32 of the pin member 29 is smaller than the smallest crest-to-crest thread diameter in the large step 31 of the box member 30. The small pin external threads can be "stabbed" past the large box external threads and the number of engaged threads. Both the small and large threads engage with each revolution to makeup the connection. Thus, the number of revolutions during which the threads slide or rub against each other is reduced for the same number of engaged threads.

Typically, connections will be designed to include metal-to-metal seals for keeping the conduit fluid pressure tight at the connections. Generally speaking, metal-to-metal seals are created when contact pressure between two metal surfaces exceeds the fluid pressure to be sealed along a continuous contact area circumferentially around a connection. The contact pressure is generally created during makeup of the connection, although some types of metal-to-metal seals are additionally energized by internally pressurizing the conduit. Metal-to-metal seals have the advantage of not suffer degradation from high temperatures or chemicals often found in a well. Smooth, uniform surfaces facilitate making a seal. Alternatively, making a seal may be facilitated by providing sufficient force to deform and compress together discontinuities to form a continuous circumferential contact pressure area between opposed pin and box surfaces. Positive-stop torque shoulders are sometimes used for this purpose.

FIG. 2, which was discussed above, shows an embodiment of a tubular joint with metal-to-metal seal 34 is located between the large step 31 and the small step 30. The seal 34 is created by interference between metal surfaces of annular shoulders at 39 on the pin member 29 and the box member 30 and the resulting metal-to-metal contact pressure. The surfaces of the annular shoulders elastically deform a slight amount in compression providing surface-to-surface sealing engagement while the interengaged threads at the two steps effectively provide a positive stop against the applied torque. A metal-to-metal seal is also shown at the nose 35 of the pin member 29. The complimentary surfaces are pushed together by the axial force generated by engagement and rotation of the load flanks when the connection 28 is made-up. It will also be understood that a metal-to-metal seal could also be formed at the base end 36 of the box member 30 of the connection. Thus, metal-to-metal seals may be formed at either end 35 or 36, or in the middle 34 of a two-step connection or at any combination of more than one of the locations 34, 35, and/or 36.

A threaded connection having one or more negative angle load flank can facilitate sealing at the connection. A negative angle flank is a flank that is not perpendicular to the centerline of the connection, but instead has an angle that creates a trapping mechanism with a complimentary flank. For example, in a thread with a dovetail cross-sectional shape, oppositely directed radial forces are generated by negatively angled flanks between the internal and external dovetail threads. The oppositely directed radial forces pull the internal and external threads together. If the internal and external threads have corresponding sizes and shapes, the trapping action can create sufficient surface-to-surface contact pressure between adjacent surfaces, between the roots and crests, and/or between load flanks and stab flanks, to effect a pressure seal at the connection.

While negative flank angles can be beneficial for certain sealing purposes, any frictional drag caused by the sliding or rubbing of one surface against another under a contact force or pressure must be overcome by the rotational torque when rotating the tubular members to makeup the connection. Completing the makeup of a connection with a large surface-to-surface contact pressure, or with a large makeup contact area, requires a large amount of torque. A large contact pressure for a given area or a larger the contact area for a given contact pressure requires a correspondingly large torque for makeup. As connection diameters increase, the thread rubbing area increases such that the same amount of surface-to-surface contact pressure will require a greater amount of torque. Also, the greater the number of revolutions required to complete makeup, under the same frictional contact conditions between threads, the greater the input work and energy required.

In U.S. Pat. Nos. 6,174,001 and 6,270,127 by Enderle, two-step, low torque wedge threads for tubular connectors are disclosed. One of the steps is provided so that there is interference contact at makeup along at least one of the complementary stab flanks, load flanks, roots and crests and so that clearance is provided along another step at least along one of the complementary stab flanks, load flanks, roots and crests for reducing the amount of torque for makeup of the connection while retaining torque sensitivity, sealing capability, and threads necessary for structural purposes. In the wedge thread arts there continues to be a need for development of desirable relationships between the contacting portions and the clearance portions and for additionally providing specific bases and criterion for determining useful relationships between surfaces of the wedge threads that make contact at makeup and the surfaces that are provided with clearance.

SUMMARY OF INVENTION

One aspect of the present invention provides improvements in prior art wedge thread connections that have contact between particular tread surfaces and clearance between others. The invention addresses reducing the significant amount of makeup torque that would normally be required to secure a connection upon simultaneous contact of the load flanks and the stab flanks of both steps of a two-step wedge thread at the final forcible makeup of the connection. It has been discovered by the inventors that in a typical two-step wedge thread, makeup torque is resisted over a large contact surface area of both the load flanks and the stab flanks of both steps of threads. Thus, it has been found that a very large applied makeup torque may result in very little elastic deformation of the contacting surface areas. Further it has been found by the inventors that insufficient plastic deformation can result in inadequate breakout resistance and can result in inadequate contact pressure to form a metal-to-metal seal. To address these findings and discoveries, one improvement according to an embodiment of the invention is a new and useful relationship between and among the amount of deformation at makeup, the elastic deformation limit on portions of a two step wedge thread connection making contact at makeup, and the amount of clearance provided at portions of the wedge thread that do not make contact at initial makeup.

One embodiment of the present invention provides for makeup engagement of only one step of a two-step wedge thread. At makeup, the other step of threads is provided with a small amount of clearance at both the stab and the load flanks. Thus, a reduced amount of makeup torque is required to provide a secure and sealed connection. A reduced amount of frictional contact exists between the threads that are not fully engaged during makeup. In particular the clearance distance is selected on the basis of the amount of elastic deformation at makeup and the elastic deformation limit of the materials involved. The clearance distance is uniquely selected on this basis to provide a secure connection that does not exceed the elastic limit at make up and to provide usable strength of both steps of threads including initially contacting potions of the threads and then clearance portions of the threads that will contact when the connection is subjected to large working forces.

In one embodiment of the invention, a threaded tubular connection has a pin member having two-steps of external threads increasing in width in one direction, a box member having two corresponding steps of internal threads increasing in width in the other direction so that complementary internal and external wedge threads move into or toward engagement upon makeup of the connection. Application of torque to the connection moves the first step of the wedge threads into engagement and generates appropriate metal-to-metal contact pressure between surfaces of the pin and box members to form a pressure seal upon makeup of the connection. The wedge threads of the second step are designed and positioned so that there is a slight clearance between the stab flanks and the load flanks of the second step threads at makeup of the first step of threads before any external working loads or forces are applied. In one such embodiment a total of the maximum deformation of the first step of wedge threads at makeup and the clearance distance between stab flanks of the second step of wedge threads is no greater than the elastic deformation limit of the material in which the wedge threads are formed.

In one embodiment a positive-stop torque shoulder is provided and metal-to-metal contact pressure is generated by the axial forces between the first step wedge threads and the positive-stop torque shoulder. According to one aspect of the invention the total of the maximum deformation of the positive-stop torque shoulder at makeup is within the elastic range of the positive-stop torque shoulder material and is no greater than the clearance distance between load flanks of the second step wedge threads.

According to another embodiment of the invention, a two-step threaded connection is provided. The first step engages and stops at a fixed axial position at makeup. The fixed axial position at makeup and before any working loads or compression forces are applied to the connection may be referred to as an "initial makeup location." The second step of threads comprises wedge threads, the flanks of which do not engage at makeup. The first step of threads may be referred to as "engaged threads" or the "engaged step" and the second set of threads may be referred to as "floating wedge threads" or the "floating step." A clearance distance is provided between load flanks and stab flanks of the floating wedge threads at the initial makeup location of the engaged threads. The clearance distance is selected such that the floating wedge threads will take up a tension load before an elastic deformation limit is exceeded for any material of the connection that is deformed upon makeup of the engaged wedge threads.

According to another embodiment of the invention, a two-step threaded connection is provided. The first step engages and stops at a fixed axial position at makeup or an initial makeup location. The second step of threads comprises floating wedge threads, the flanks of which do not engage at makeup when the engaged threads are at the initial makeup location. A clearance distance is provided between load flanks and stab flanks of the floating wedge threads. The clearance distance is selected such that the floating wedge threads will take up a compression working force before an elastic deformation limit is exceeded for any material of the connection that is deformed upon makeup of the engaged wedge threads.

One embodiment of the invention includes a two step wedge thread design. At make-up, one step will be forcibly engaged (the "engaged threads"), for example with the load flanks pushing together opposing surfaces of a positive-stop torque shoulder, and the other step will have clearance at both the stab and the load flanks (the "floating wedge threads"). The amount of deformation of the positive-stop torque shoulder at makeup will be less than the elastic deformation limit of the material of the positive-stop torque shoulder (no plastic deformation). The clearance distances are small between the stab flanks and between the load flanks in the floating wedge threads. The clearance distances may be the same or different for the stab and load flanks. In one example, the clearance at the floating wedge thread stab flanks is less than or at least no greater than an additional amount of deformation that would be required to reach the elastic limit of the positive-stop torque shoulder. Thus, when additional compression forces are applied to the connected tubular members, the total elastic deformation limit of the positive-stop torque shoulder will not be exceeded before the stab flanks of the floating wedge threads begin to carry the additional forces. In another example, the clearance is also less than or at least no greater than the makeup deformation of the positive-stop torque shoulder so that contact at the positive-stop torque shoulder will not be released before the load flanks of the floating wedge threads begin to carry added load forces. Maintaining a metal-to-metal seal is thereby facilitated. With appropriate clearance at both the stab and the load flanks of the floating wedge threads, tension or compression, and tension and compression simultaneously as might occur during bending, can be handled without exceeding the elastic limit and without loosing contact at the positive-stop torque shoulder.

Other aspects and advantages of the invention will be apparent from the following description and the appended claims.

DETAILED DESCRIPTION

Figure 1:
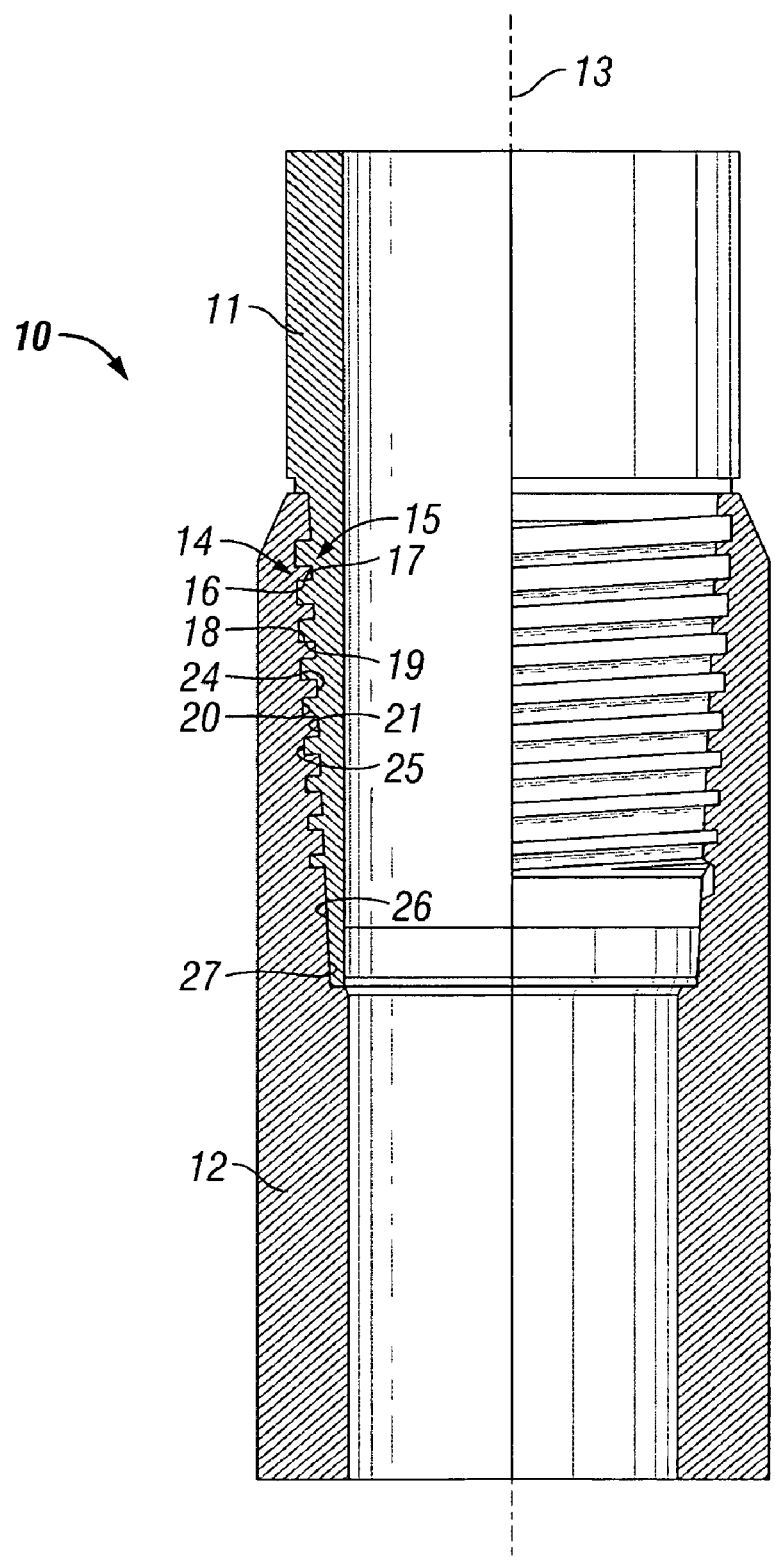
FIG. 1 is partial cutaway section view of a prior art single-step threaded tubular connection.
Figure 2:
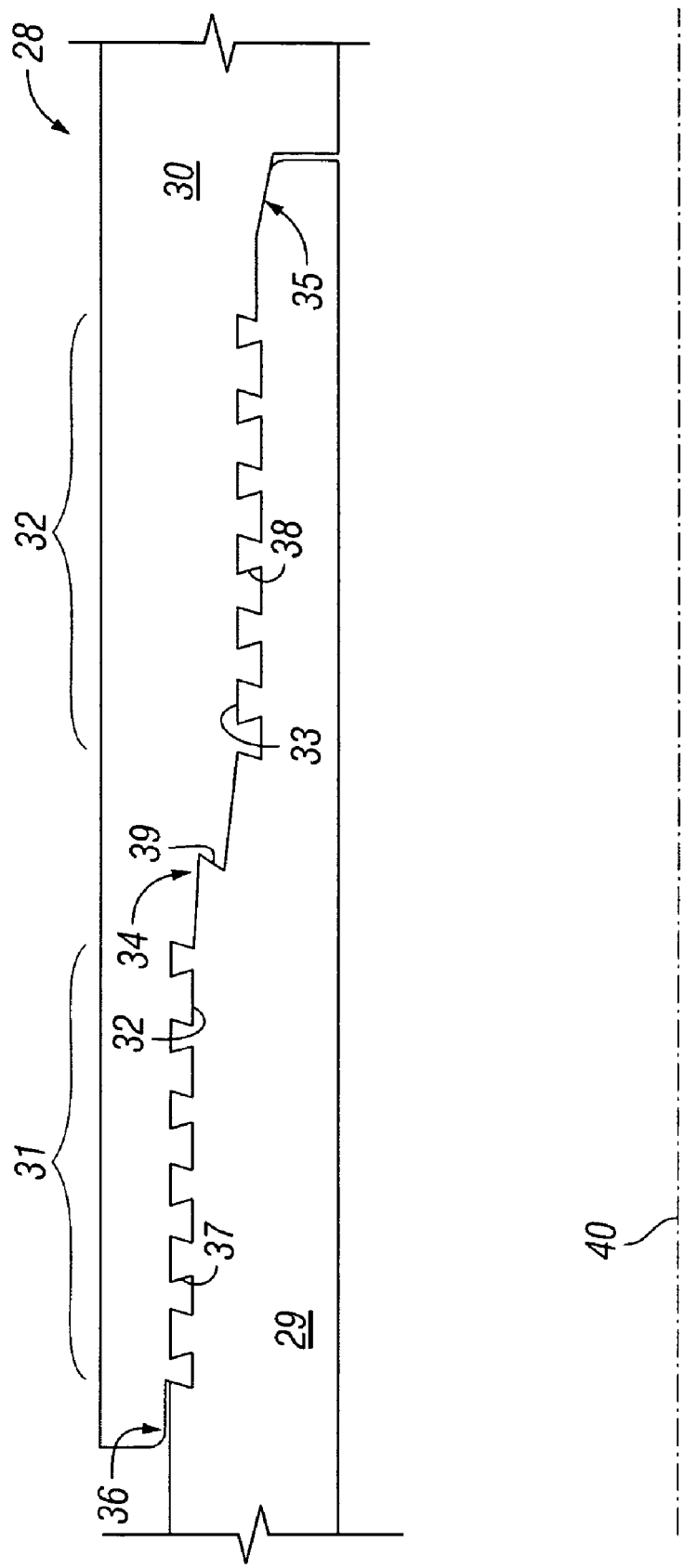
FIG. 2 is a partial cutaway section view of a prior art two-step wedge treaded tubular connection.

Prior art wedge thread designs offer some distinct advantages over other thread designs which can include high torsion, high compression, and reliable internal and external pressure sealing capabilities. The inventors have found that there are, however, several considerations involved when designing connections using wedge thread technology. An ongoing consideration is the reduction of the amount of torque and work required to makeup the connection. The effect is multiplied by numerous repeated coupling and decoupling of connections associated with using oil field tubular members. A further consideration is to provide a connection that will remain secure and sealed during use. Another concern is to provide connections that can adequately carry cyclic working loads, forces, torques, and bending moments (i.e., having characteristics of tension and compression simultaneously). Other considerations include the inherent wear characteristics, flattening, galling, and fatigue associated with numerous makeup and breakout of the connections. Another consideration is the possibility of plastic yielding of portions of the connection upon the application of makeup torque and/or during use. Another consideration is the amount of torque required to adequately compress the metal-to-metal contacting surfaces to insure a secure connection and to provide a high contact pressure seal entirely around the circumference of the threaded connection. Deformation that is within the elastic limit of the tubular material, at the contact surfaces between threads or at a positive-stop torque shoulder, can serve to form a secure connection and can also serve to provide a pressure seal at makeup. The combined effect of makeup torque and working forces on the threads, on any positive-stop torque shoulder, and on any metal-to-metal sealing surfaces should not normally exceed the elastic limits of the material as determined by the yield strength of the material involved.

Use of tapered two-step wedge threads facilitates the reduction of friction and wasted energy compared to uniformly dimensioned threads. The two-steps and the tapered pin and box allow the threads to be stabbed deeply into the tapered box before the threads first make contact. The taper helps keeps the crest and roots from interfering at least until the final stages of makeup The wedge threads also makeup easier because they have space between the flanks until the last bit of makeup. A major portion of the torque required to overcome the friction and to create appropriate thread deformation for securing the connection, results only at the final stages of makeup rotation when the dimensions of the pin wedge threads closely match the dimensions of the box wedge threads. Thus, use of a two-step tapered wedged thread reduces the amount of friction, torque, and work required for makeup because fewer rotations (compared to a uniform thread) are required for makeup and the wedge threads do not engage with high surface-to-surface contact pressure until the final portion of the makeup rotation.

In general, according to one aspect of the invention, a threaded tubular connection has a pin member having a first step of external wedge threads increasing in width in one direction, and a box member having a corresponding first step of internal wedge threads increasing in width in the other direction so that complementary internal and external wedge threads move into engagement upon makeup of the connection. In one embodiment the connection includes a positive-stop torque shoulder. The first step of threads and the positive-stop torque shoulder are designed and positioned so that there are slight clearances between the stab flanks and between the load flanks of a second step of threads upon makeup of the first step of threads and the positive-stop torque shoulder. For example, the slight clearances at the stab and load flanks in the second step may range from a few ten-thousandths of an inch to a few thousandths of an inch. Compared to simultaneous makeup of both steps of two-step wedge threads, a smaller amount of torque is required to provide adequate elastic compression, and thus to provide secure makeup and complete surface-to-surface sealing at the positive-stop torque shoulder and/or the threads.

In one embodiment, at least the load flanks of one step of two-step wedge threads are engaged by the application of makeup torque. The engaged load flanks thereby provide axially directed force pushing together opposed surfaces of a positive-stop torque shoulder. The wedge threads of the one step are thus forcibly engaged and the wedge threads of the other step have clearance. The step and the wedge threads that are engaged at makeup may be referred to as the "engaged step" or the "engaged threads." The step and the threads that have clearance may be referred to as the "floating step" and the "floating wedge threads." The amount of makeup torque applied determines the positively stopped positions or the "initial makeup locations" of the relative portions of the connection at completed makeup and before external axial tensile loads, compressive forces or bending moments are applied to the connection. The connection is formed and the makeup torque is selected so that at makeup, selected or adjusted axial clearance distances are formed both between the corresponding load flanks of the pin and the box and between the corresponding stab flanks of the pin and the box of the floating wedge threads.

According to one embodiment of the invention, the makeup torque is selected so that the deformation of the engaged threads in the axial direction is less than the elastic limit of the material in which the threads are formed and so that the deformation of the positive-stop torque shoulder in the axial direction is also less than the elastic limit of the positive-stop torque shoulder material. Thus, upon the application of makeup torque, the engaged threads provide an axially directed force pushing the pin surface of the positive-stop torque shoulder against the box surface of the positive-stop torque shoulder and thereby causing axial elastic deformation both in the engaged wedge thread and in the positive-stop torque shoulder. The relative positions of the floating wedge threads of the pin and of the box are established at makeup with a clearance in the axial direction between the "floating" load flanks that is less than the axial deformation of the load flanks of the engaged threads. Also clearance between the floating stab flanks is less than the axial deformation of the positive-stop torque shoulder. Thus, the floating wedge threads do not provide any significant axially directed force at makeup and do not significantly resist the makeup torque. In this embodiment, a working load on the tubular members is initially carried by the load flanks of the engaged threads. A working compression force will be initially carried by the positive-stop torque shoulder. The floating wedge threads do not initially carry a significant amount of axially directed working loads or forces. The floating wedge threads do not initially carry any significant tension load because at the initial make up location there is clearance between the floating load flanks of the pin and box. The floating wedge threads do not initially carry any significant compressive working force because at the initial makeup location there is clearance between the floating stab flanks.

Figure 3:
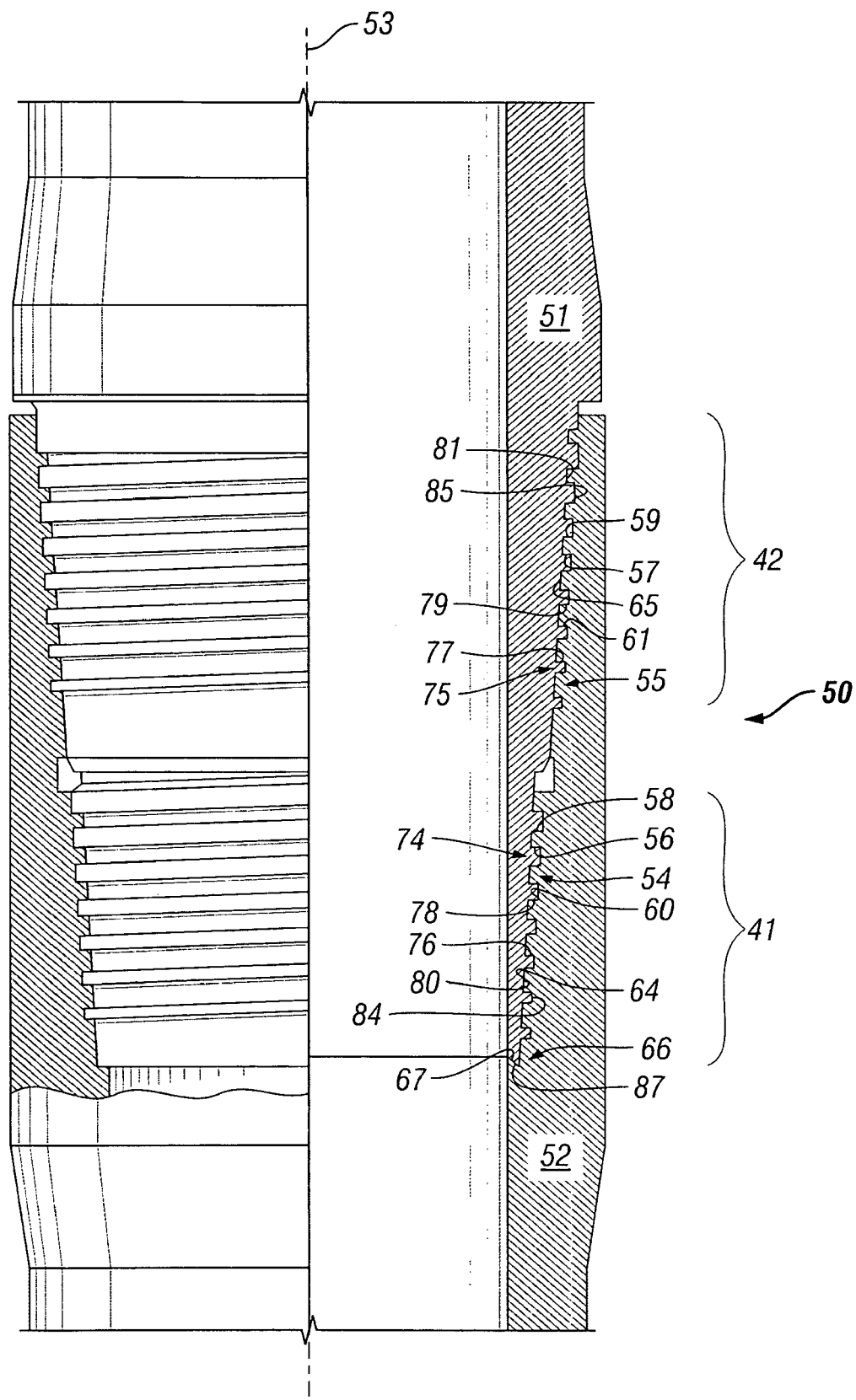
FIG. 3 is partial cutaway section view of a tubular connection according to one embodiment of the invention.

FIG. 3 shows one embodiment of an inventive connection 50 that includes internal threads 54 and 55 of a box member 52 and external threads 74 and 75 of pin member 51 formed in a two-step wedge configuration along a central axis 53. The external threads 54 and 55 increase in width progressively at a uniform rate in one direction substantially the entire helical length of each thread 54 and 55. The external threads 74 and 75 increase in width progressively at a uniform rate in the other direction substantially the entire helical lengths of threads 74 and 75.

The internal thread 54 is formed for engagement with the external thread 74 along a small diameter step 41. The internal thread 55 is formed for floating engagement with the external thread 75 along a large diameter step 42. While the threads depicted in FIG. 3 appear to have a generally rectangular cross-section, it will be understood that the wedge threads may have other shapes such as dovetail threads or hook threads, for purposes and benefits associated with such other shapes of wedge threads. Thus, various different forms of threads may be used in combination with, and without departing from, other aspects of the present invention.

Figure 4:
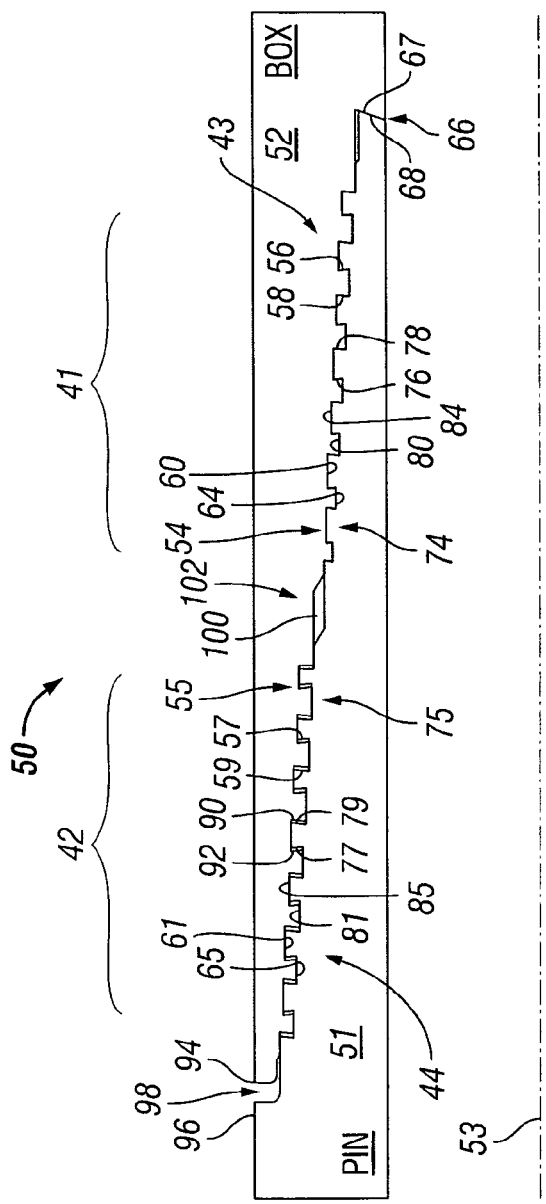
FIG. 4 is partial section view of the tubular connection according to an embodiment of the invention of FIG. 3.

In FIG. 4, additional detail is shown of a dovetail shaped wedge thread construction, similar to two-step wedge configuration shown in FIG. 3. An internal thread 54 is formed in the box portion 52 and along the small step 41. The internal thread 54 includes stab flanks 58, load flanks 56, roots 60, and crests 64. A complementary external thread 74 is formed in the pin portion 51 and along the small step 41. The external thread 74 includes complementary stab flanks 78, load flanks 76, roots 80, and crests 84.

An internal thread 55 is formed in the box 52 along the large step 42. The internal thread 55 has stab flanks 59, load flanks 57, roots 61, and crests 65. A complementary external thread 75 is formed along the large step 42 on the pin 51. The external thread 75 includes complementary stab flanks 79, load flanks 77, roots 81, and crests 85.

During rotational makeup of the connection 50, the oppositely increasing thread widths (or wedge shape) of the threads 54 and 74 cause the complementary flanks, of the respective threads to move toward forcible engagement upon relative rotation of the pin 51 and box 52 tubular members. The corresponding tapers of the pin 51 and the box 52 cause the complementary roots and crests to move toward engagement. In this embodiment, a positive-stop torque shoulder 66 is formed between a nose surface 67 of pin 51 and an inside diameter (ID) surface 87 of the box 52. The leads of the engaged internal and external threads 54 and 74, respectively, push the pin nose surface 67 against the box ID surface 87 to form a seal that resists the flow of fluids at the positive-stop torque shoulder 66. In particular, makeup torque applied to the connection 50 causes the load flanks 56 and 76 in the small step 41 to engage and thereby forces the surface 67 and 87 of the positive-stop torque shoulder 66 into surface-to-surface engagement. For convenience, the internal and external threads 55 and 75 together may be referred to as "engaged threads" 43. When the applied makeup torque is sufficiently resisted by the stress and resulting strain at the engaged threads 43 and the opposing surfaces of the positive-stop torque shoulder 66, rotation is stopped. The amount of strain, and therefore the amount of deformation, of the engaged flanks 56, 76 and positive-stop torque shoulder surfaces 67, 87 is determined by the modulus of elasticity and strength of the materials. The relative positions of the pin 51 and box 52 at makeup are thus fixed, or positively stopped, at an initial makeup location that can be determined depending upon the amount of makeup torque applied.

The internal and external threads 55 and 75 of the large step 42 are formed so that when the small step 41 is forcibly made up as described above, a small clearance 90 will remain between the stab flanks 59 and 79 and a small clearance 92 also will remain between the load flanks 57 and 77. The wedge internal and external wedge threads 55 and 75, respectively, together with the clearance distance 90 between the stab flanks 59 and 79 and the clearance distance 92 between the load flanks may be referred to as "floating wedge threads" 44.

While it is useful in certain situations for the engaged wedge threads 43 to be at the small step 41 as shown in FIGS. 3 and 4, it will be understood that the engaged wedge threads 43 may be formed at either the small step 41 or the large step 42, and the floating wedge threads 44 may be formed at the other step, whether at the large step 42 or the small step 41, without departing from the scope of the invention.

The positive-stop torque shoulder 66 is formed at the interface of the pin nose 67 and the box inner diameter (ID) 87. In this embodiment, the engaged threads 43, the floating wedge threads 44, and the positive-stop torque shoulder 66 forms the threaded connection 50 between the pin 51 and the box 52. Thus, upon application of a selected amount of makeup torque to makeup the connection 50, at least the load flanks 56 of the pin member 51 and the load flanks 57 of the box member 52 in the engaged step become engaged and forcibly push the positive-stop torque shoulder 66 into surface-to-surface engagement. According to one useful aspect of this embodiment, the contact area of the positive-stop torque shoulder 66 is less than the contact area of the load flanks 56 and 57 so that the maximum axial deformation in the connection at makeup will be at the positive-stop torque shoulder 66. This facilitates forming a pressure seal at the interior diameter of the pin and box tubular members 51 and 52. A complete seal at the positive-stop torque shoulder 66 prevents pressurized fluid in the interior of the tubular members from entering into and between the threads 54, 74 of the threaded connection 50.

It will be understood that while at least the load flanks 56 and 76 of the engaged threads 43 will be engaged at makeup, the stab flanks 58 and 78 of the engaged threads 43 may also become engaged at makeup. For example, if the engaged threads 43 are wedge threads, they can be formed so that they makeup simultaneously at both the load flanks 56 and 76 and at the stab flanks 58 and 78. Such a construction can be useful for certain purposes, as for example for the purpose of bringing the flank surfaces and the root and crest surfaces into sealing engagement. However, it is not necessary for the stab flanks 58 and 78 to be engaged, provided that the load flanks 56 and 76 forcibly makeup pushing against the positive-stop torque shoulder 66.

At makeup, an axially spaced gap 98 may be formed between a box face 94 and a pin OD 96. Thus, the box face 94 and the pin OD 96 might not make contact. A gap 100 may also be formed at an interface 102 between the step 41 of engaged threads 43 and the step 42 of floating wedge threads 44. This allows the position, strength, and axial deformation of the positive-stop torque shoulder 66 to be the primary factors for establishing the relative positions of the internal and external threads 55 and 75 of the floating wedge threads 44 at makeup.

Referring to FIGS. 4 and 5A-5D, the interaction of the various portions of the engaged threads 43 for a plurality of alternative embodiments can be more fully understood. In the alternative shown in FIG. 5A, the load flanks 56 and 76, the stab flanks 58 and 78, the box roots 60 and pin crest 80, and box crests 64 and pin roots 84 of the engaged threads 43 may all come into surface-to-surface contact at makeup to facilitate sealing.

Figure 5B:
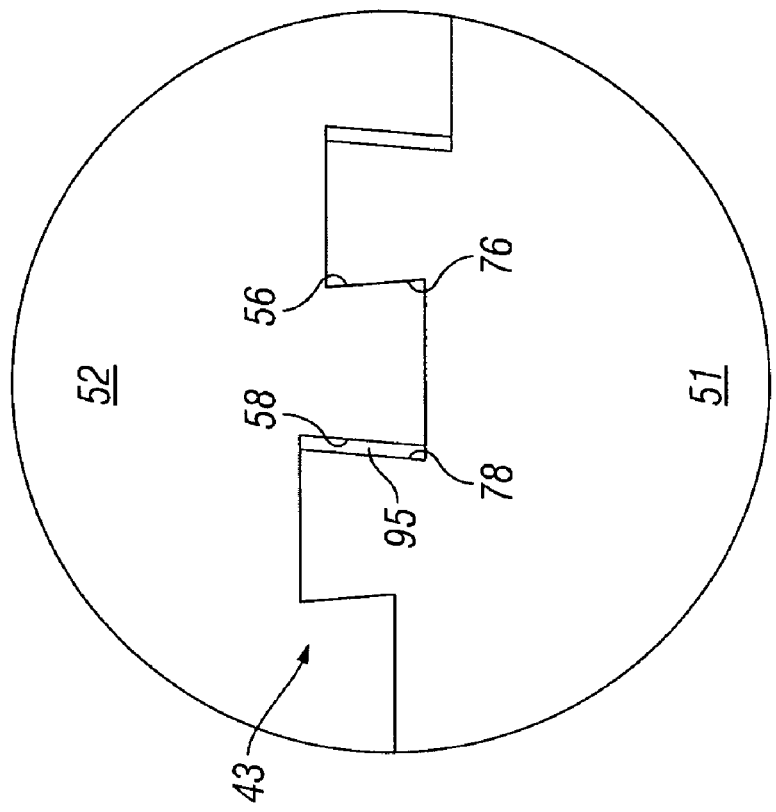
FIG. 5B is an enlarged section view of engaged threads according to an embodiment of the invention.

Alternatively, as shown in FIG. 5B, the engaged threads 43 may be formed so that the load flanks 56 and 76 are engaged and the stab flanks 58 and 78 are spaced apart by a small clearance 95 in the axial direction. This construction will help to insure that most, if not all, of the entire axial force generated by the engaged load flanks 56 and 76 is applied to the positive-stop torque shoulder 66.

Figure 5A:
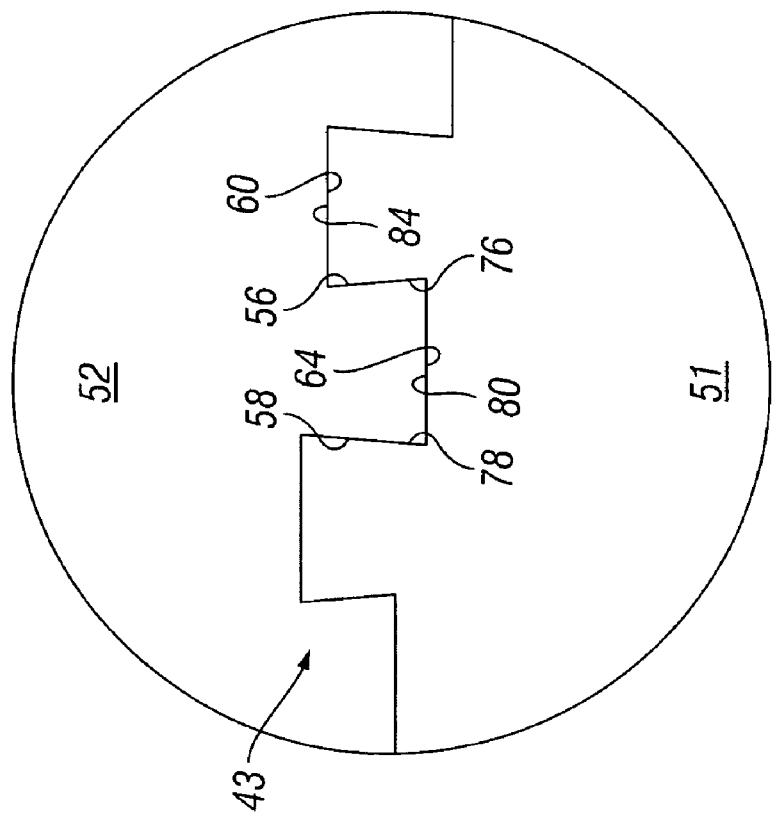
FIG. 5A is an enlarged partial section view of engaged threads according to an embodiment of the invention.

In both embodiments of FIGS. 5A and 5B, the roots and crests are depicted without radial clearance. It will be understood with reference to FIG. 5C that in other alternative embodiments of the engaged threads 43, a small radial clearance 104 may be formed between box roots 60 and pin crests 84 and a small radial clearance 105 may be formed between box crests 64 and pin roots 80. It will also be understood with reference to FIG. 5D that a root-to-crest clearance 105 maybe formed between one set of pairs of roots to crests, for example roots 60 to crest 84, and no clearance at the other pairs of roots 64 and crests 80. No clearance between roots 60 and crests 80 may indicate interference between the respective roots and crests surfaces that can facilitate pressure sealing.

Figure 5D:
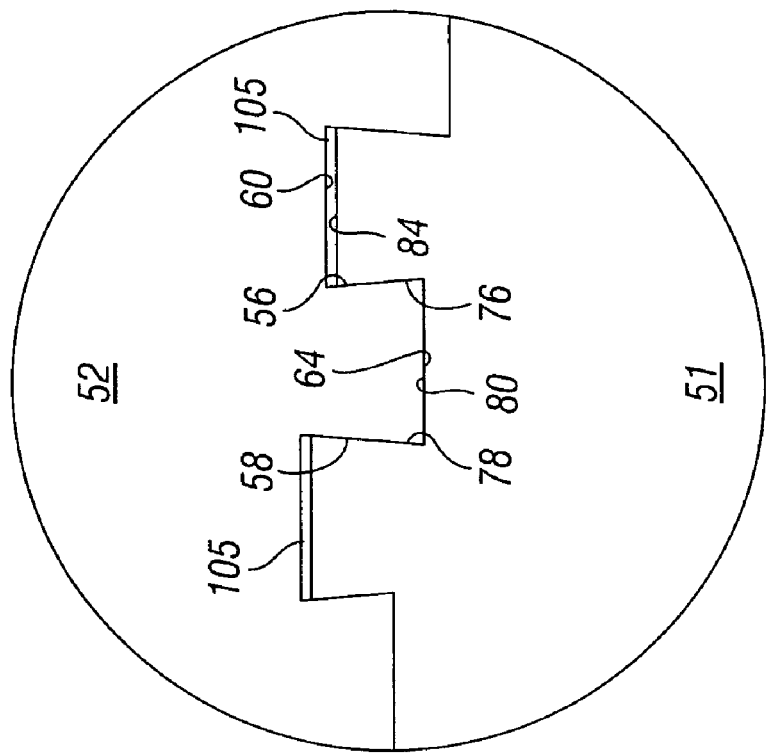
FIG. 5D is an enlarged section view of engaged threads according to an embodiment of the invention.
Figure 5C:
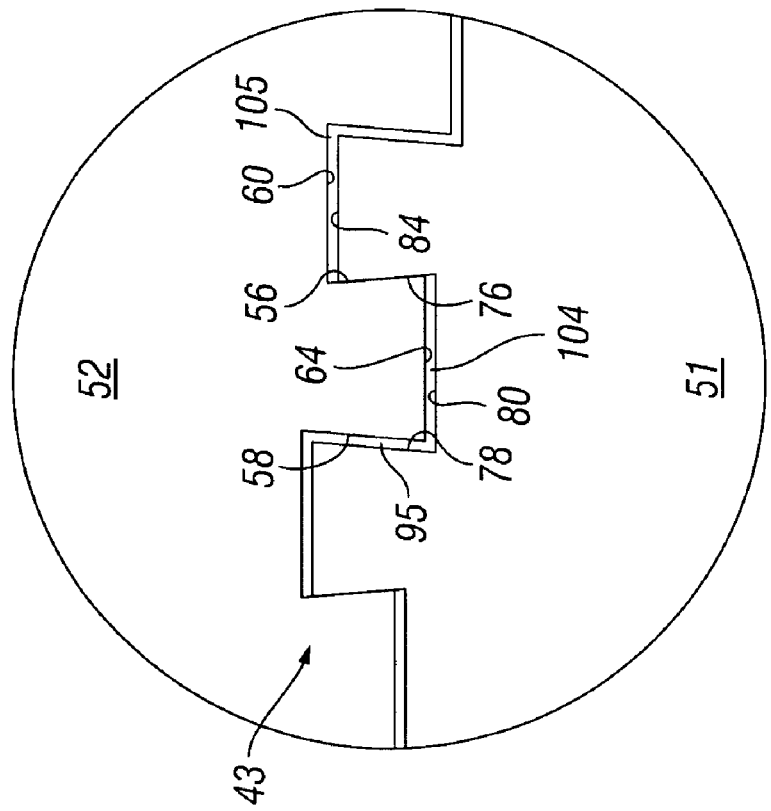
FIG. 5C is an enlarged section view of engaged threads according to an embodiment of the invention.

Although all of the possible variations of root-to-crest clearance in the engaged threads 43 are not shown in FIGS. 5A-5D, it will be understood that a root-to-crest clearance may be formed whether only the load flanks 56 and 76 are engaged (see FIGS. 5B and 5C) or both the load flanks 56 and 76 and the stab flanks 58 and 78 are engaged (see FIGS. 5A and 5D). Further, it will be understood that at makeup, a root-to-crest radial clearance 104 may be formed without any root-to-crest radial clearance at roots 60 and crests 84, a root-to-crest clearance 105 may be formed without a root-to-crest clearance at roots 80 and crests 64, or both root-to-crest radial clearances 104 and 106 may be formed.

Figure 6A:
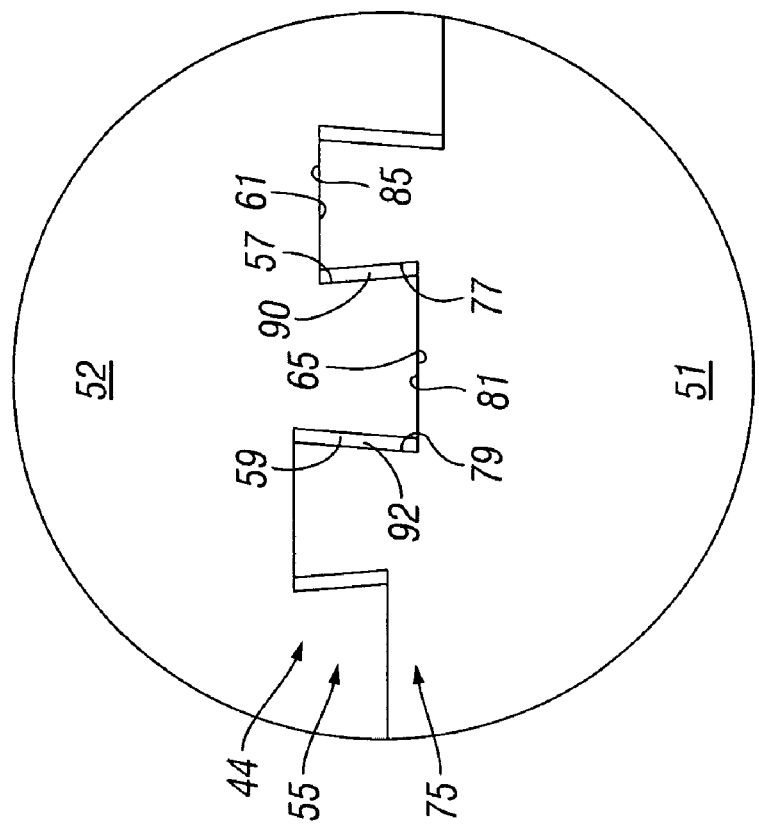
FIG. 6A an enlarged section view of floating wedge threads according to an embodiment of the invention.

Referring to FIGS. 4 and 6A-6C, the interaction of the various portions of the floating wedge threads 44 for a plurality of alternative embodiments can be more fully understood. In the alternative embodiment shown in FIG. 6A, the floating threads 44 are formed so that upon makeup, a clearance distance 90 exists in the axial direction between the load flank 77 of the pin 51 and the load flank 57 of the box 52. A clearance distance 92 is also formed in the axial direction between the stab flanks 79 of the pin 51 and the stab flanks 59 of the box 52. Thus, the external thread 75 of the pin 51 is permitted, upon application of sufficiently large working forces, to move or to "float" axially relative to the internal thread 55 of the box 52. The applied working forces will be sufficiently large to cause "floating" (or relative movement) if they are large enough to cause additional elastic deformation of a portion of the connection 50. As shown in FIG. 6A, a slight radial clearance 106 may be formed between the pin roots 81 and the box crests 65, and a slight radial clearance 107 may be formed between the pin crests 85 and the box roots 61. This may, for example, facilitate relative movement or floating between the pin 51 and the box 52 in the area of the floating threads 44.

Figure 6B:
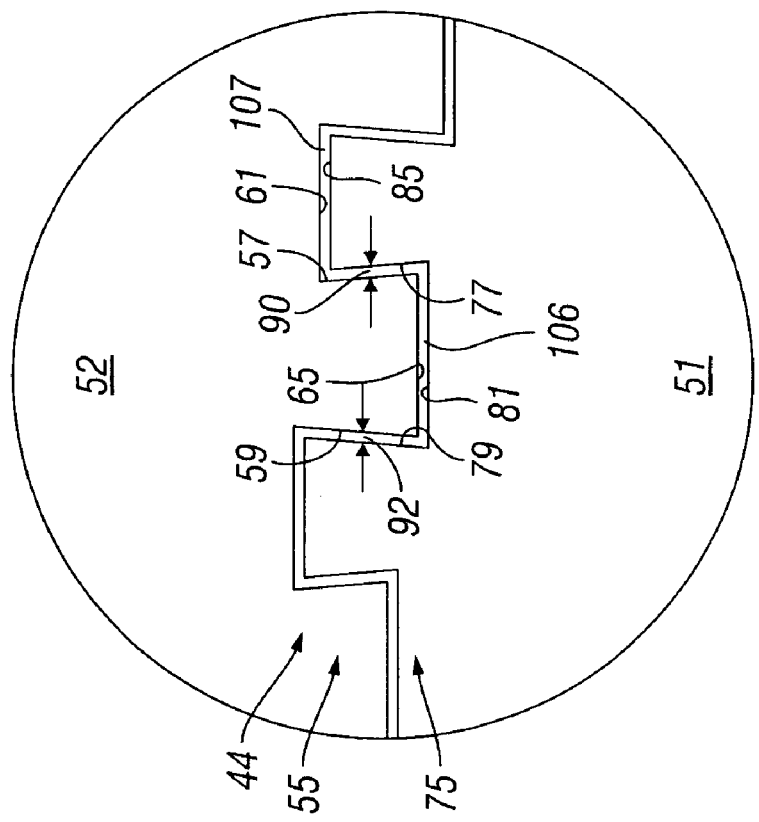
FIG. 6B an enlarged section view of floating wedge threads according to an embodiment of the invention.

In an alternative embodiment as shown in FIG. 6B, the pin roots 81 and the box crests 65 and also the pin crests 85 and the box roots 61 of the floating wedge threads 44 may be formed so that they come into surface-to-surface contact upon makeup. This may, for example, usefully provide additional rigidity, full thread-to-thread alignment, and fluid pressure sealing.

Figure 6D:
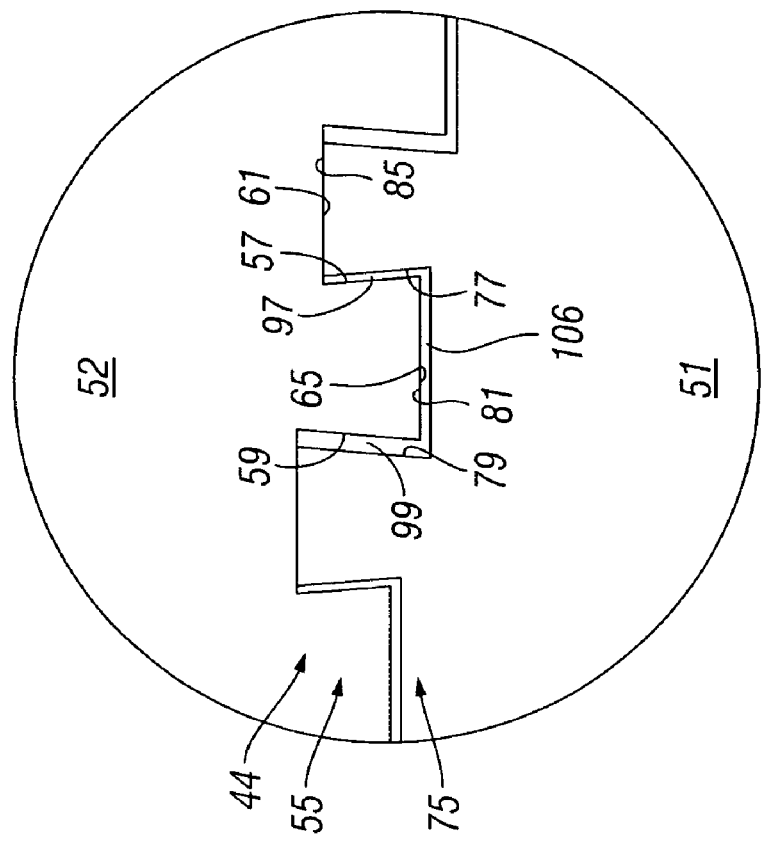
FIG. 6D an enlarged section view of floating wedge threads according to an embodiment of the invention.
Figure 6C:
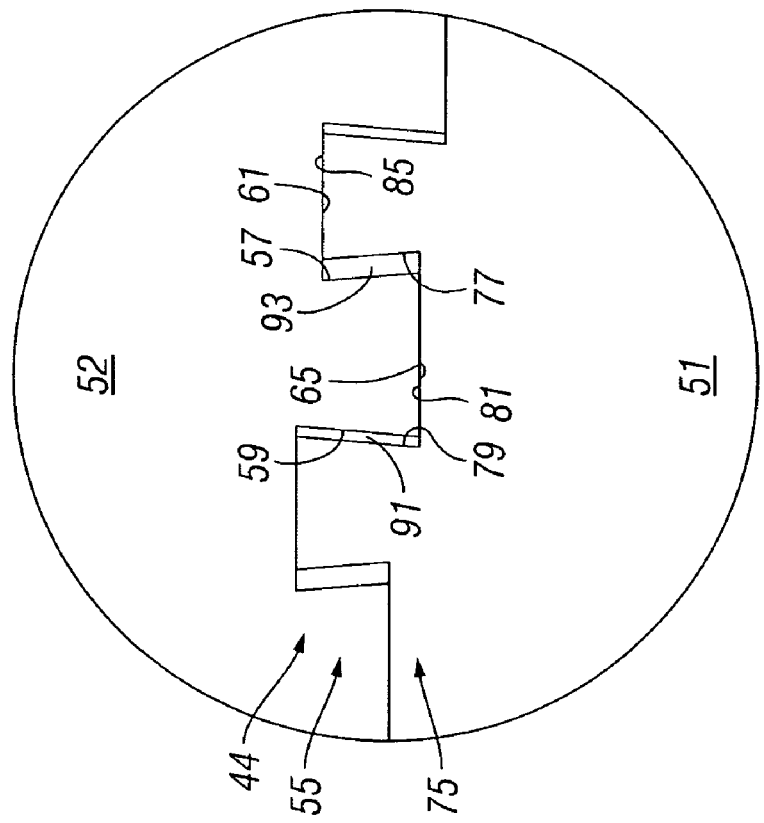
FIG. 6C an enlarged section view of floating wedge threads according to an embodiment of the invention.

In an alternative embodiment as shown in FIG. 6C, a clearance distance 93 between the stab flanks 59 and 79 may be smaller than the clearance distance 91 between the load flanks 57 and 77. Thus, a smaller amount of additional applied working load deformation of the load flanks 56 and 76 of the engaged threads 43 (not shown in FIG. 6C, see FIGS. 4 and 5A-5B) would be permitted before the floating wedge load flanks 57 and 77 begin to carry the applied working load.

In the alternative embodiment shown in FIG. 6D, a relatively larger clearance 99 is formed between the stab flanks 59 and 79 and a relatively smaller clearance 97 is formed between the load flanks 57 and 77. In such an embodiment, a larger amount of deformation at the positive-stop torque shoulder 66 and/or at the stab flanks 58 and 78 of the engaged threads 43 caused by applied working compression forces would be permitted before the floating wedge stab flanks 59 and 79 begin to carry the compression working forces.

A sufficient working load or force can cause additional deformation in the engaged wedge threads 43 or in the positive-stop torque shoulder 66. Thus, for example, the construction of the inventive connection can be adjusted depending upon the whether the expected amount of additional tension working loads or expected amount of compression working forces is greater. Thus, when the additional deformation exceeds the clearance distance 90 (or 93 in FIG. 6C or 97 in FIG. 6D) between the load flanks 57 and 77 of the floating wedge threads 44, the floating wedge threads 44 also begin to carry the working load. When the additional deformation exceeds the clearance distance 92 (or 91 in FIG. 6C or 99 in FIG. 6D) between stab flanks 59 and 79 of the floating wedge threads 44, the floating wedge threads 44 also begin to carry the working load or force.

To avoid or reduce plastic yielding of the material, under a tension working load, the deformation of the engaged threads 43 at makeup, together with the amount of additional deformation permitted before the load flanks 57 and 77 of the floating wedge threads 44 make contact (i.e., the deformation of the engaged threads 43 plus the floating load flank clearance distance 90, 93, or 97), should be no greater than the elastic limit of the material of the engaged threads 43. Also, to avoid or reduce loss of a seal at the positive-stop torque shoulder 66, the deformation of the positive-stop torque shoulder 66 at makeup, together with the amount of additional tension deformation permitted before the load flanks 57 and 77 of the floating wedge threads 44 make contact (i.e., the load flank clearance distance 92, 93, or 97), should be no greater than the elastic deformation limit of the deformed material.

Also, to avoid plastic yielding of the material, under a compression working force, the total of the amount of deformation of the positive-stop torque shoulder 66 plus the amount of additional compressive deformation permitted before the stab flanks 59 and 79 of the floating wedge threads 44 make contact (i.e. the positive-stop torque shoulder deformation plus the floating stab flank clearance distance 92, 91, or 99) should be less than the elastic limit of the deformed positive-stop torque shoulder material. Also, in cases where the stab flanks 58 and 78 of the engaged thread 43 act as a torque stop, the total of any deformation of the stab flanks of the engaged wedge threads 43 at makeup plus the amount of additional compressive deformation permitted before the stab flanks 59 and 79 of the floating wedge threads 44 make contact (i.e. the deformation of the engaged stab flanks plus the floating stab flank clearance distance 92, 91, or 99) should be less than the elastic limit of the deformed stab flank material.

Although it might not be as critical for sealing purposes because the positive-stop torque shoulder contact increases under compression loading, it will be understood that loss of surface-to-surface contact between the load flanks 56 and 76 of the engaged threads 43 will be reduced or avoided if the compressive deformation permitted before contact between the floating stab flanks 59 and 79 (i.e. the floating stab flank clearance distance 92, 91, or 99) is no greater than the initial makeup deformation of the load flanks 56 and 76 of the engaged threads 43.

In the case of a tension working load, the load flanks 56 and 76 of the engaged wedge threads 43 initially carry the working load. If the working tension load causes the axial deformation of the engaged load flanks 56 and 76 to exceed the clearance distance between the floating load flanks 57 and 77, the floating load flanks 57 and 77 will make contact and will begin to support the tension working load. Thus, it has been found to be useful to form the engaged threads 43 and floating wedge threads 44 so that at make up, the sum of the axial deformation of the engaged load flanks 56 and 76, plus the axial clearance distance between the floating load flanks, totals no greater than the elastic deformation limit of the material of the threaded connection. Therefore, the elastic deformation limit of the engaged load flanks 56 and 76 is not exceeded before the floating wedge thread 44 begins to carry the working load.

It has also been found to be useful to form the engaged threads 43 and floating wedge threads 44 so that, at make up of the engaged wedge threads 43 and the positive-stop torque shoulder 66, the clearance distance between the floating load flanks 57 and 77 is no greater than the axial deformation of the positive-stop torque shoulder 66. In this configuration, the total deformation of the positive-stop torque shoulder 66 under a compression working force will not exceed the elastic limit before the floating stab flanks 78 and 79 begin to carry the additional compressive force. Under a tension working load, the pressure at the positive-stop torque shoulder 66 will be reduced, but surface-to-surface contact will not be lost between the opposed surfaces of the positive-stop torque shoulder 66 before the load flanks of the floating wedge threads 44 begin to carry the compressive working force.

Similarly, in the case of a compression working force, the positive-stop torque shoulder 66 initially carries the compression working force. At makeup of the engaged load flanks 56 and 76 and the positive-stop torque shoulder 66, it will be understood that there might be either a small amount of clearance or there might be a small amount of contact and compressive axial deformation between the stab flanks of the engaged wedge threads 43. Either the positive-stop torque shoulder 66 alone or the positive-stop torque shoulder 66 and the stab flanks 58 and 78 of the engaged wedge threads 43 will carry the force until axial deformation exceeds the clearance distance between the floating stab flanks 59 and 79. If applied working compression forces cause the axial displacement of the floating wedge threads 44 to exceed the clearance distance between the floating stab flanks 59 and 79, the floating stab flanks 59 and 79 will make contact and will begin to supports the working compression forces. It has been found to be useful to form the two-step wedge threads so that at make up, the sum of the axial deformation of the positive-stop torque shoulder 66 plus the axial clearance distance between the floating stab flanks 59 and 79 totals no greater than the elastic deformation limit of the deformed material. Thus, the elastic deformation limit of the positive-stop torque shoulder 66 is not exceeded before the working compression forces begin to be carried by the floating wedge threads 44.

It has also been found to be useful to form the threads 43 and 44 so that, at makeup of the engaged wedge threads 43 and the positive-stop torque shoulder 66, the clearance distance between the floating stab flanks 59 and 79 is no greater than the axial deformation of the engaged load flanks 56 and 76. Under a compression working force, the deformation at the engaged load flanks 56 and 76 will be reduced, but contact between the surfaces of the engaged load flanks 56 and 76 will not be lost before the floating stab flanks 59 and 79 begin to carry the working force.

Figure 7:
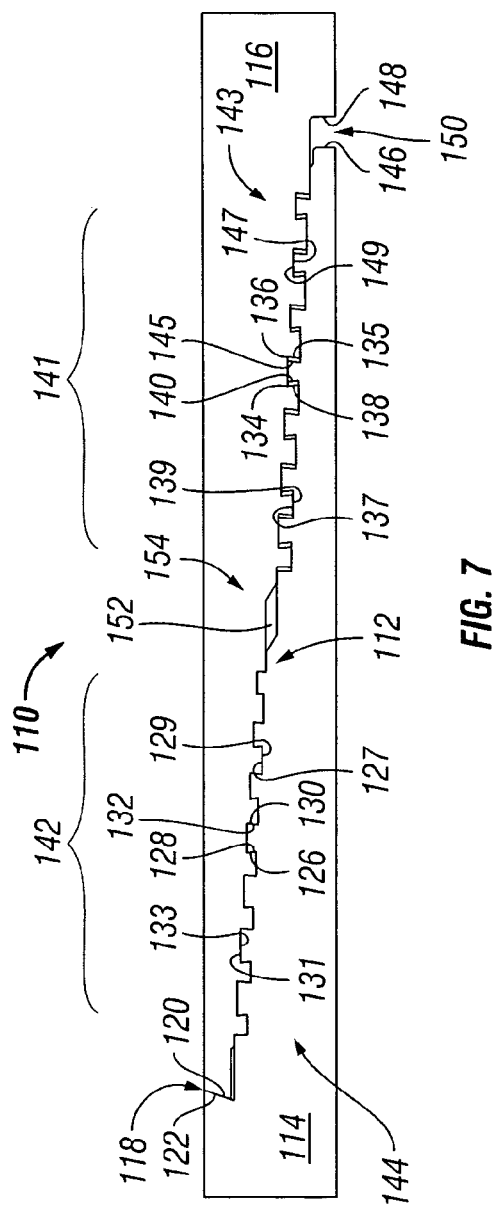
FIG. 7 is partial section view of a tubular connection according to an alternative embodiment of the invention.
Figure 8:
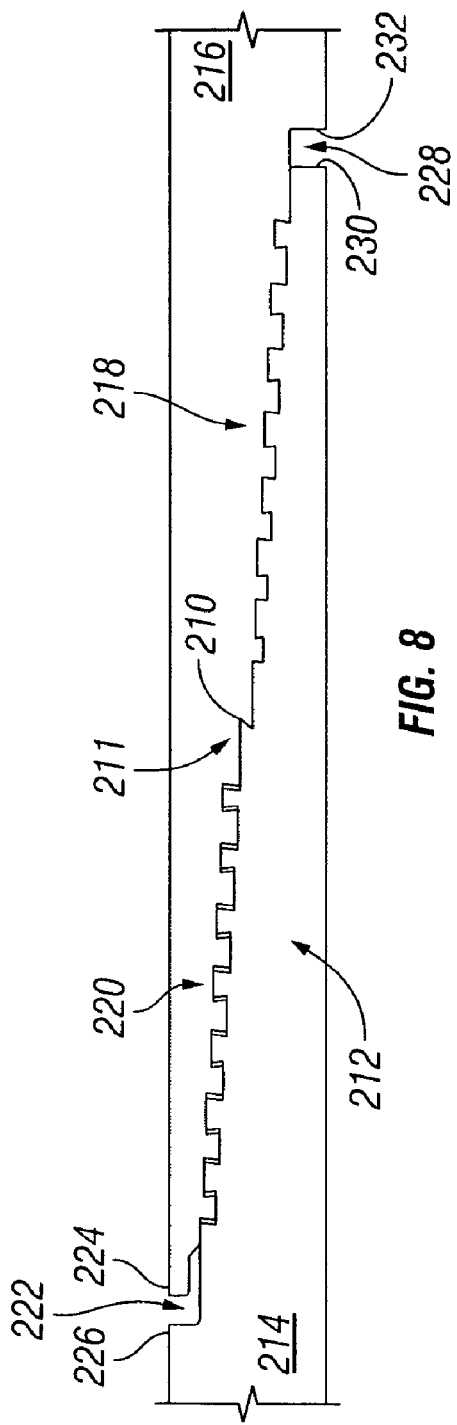
FIG. 8 is partial section view of a tubular connection according to an alternative embodiment of the invention.
Figure 9:
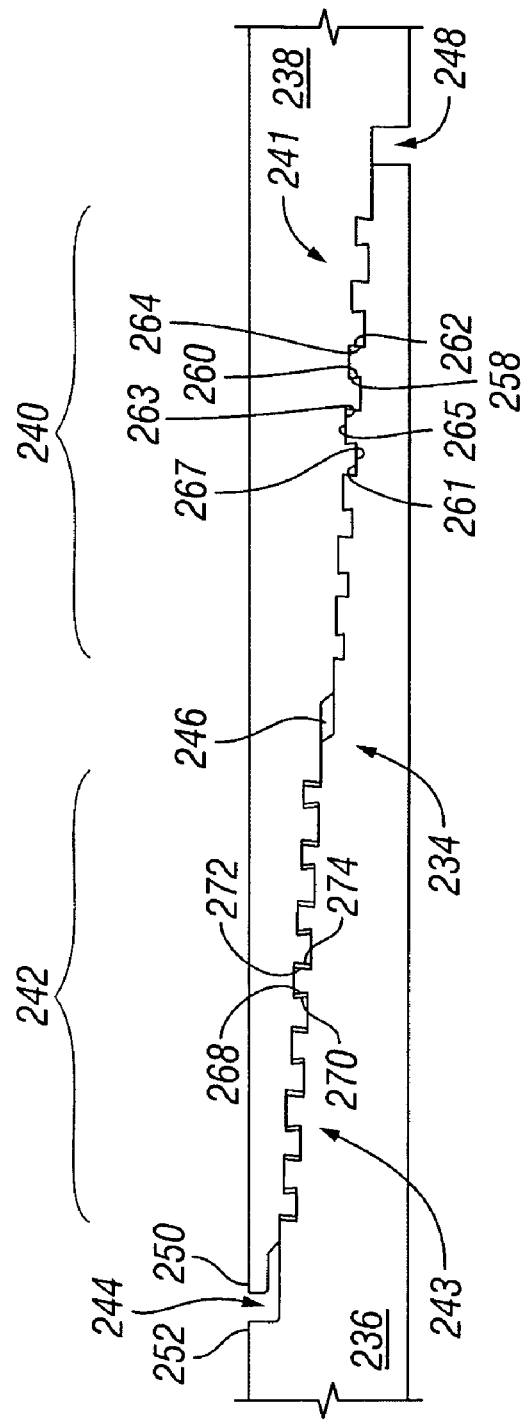
FIG. 9 is partial section view of a tubular connection according to an alternative embodiment of the invention.

FIGS. 7-9 illustrate cross sections of alternative embodiments of the invention with different configurations of two-step wedge thread structures. Each of the FIGS. 7-9 show a portion of a pin member and a box member with threads formed in accordance with alternative embodiments of the invention.

The embodiment shown in FIG. 7 is a two-step wedge thread 110 forming a tapered joint or connection 112 between a tubular pin member 114 and a tubular box member 116. A positive-stop torque shoulder 118 is formed between a box face 120 and a pin outer diameter (OD) 122. The large step 142 of the two-step wedge threads 110 is engage at least between a load flank 126 of the pin member 114 and a load flank 128 of the box member 116 upon makeup of the connection. The positive-stop torque shoulder 118 is also engaged upon makeup. A selected amount of makeup torque determines the relative makeup positions of the pin 114 and the box.116. In one embodiment, upon application of the selected makeup torque, the stab flank 130 of the pin 114 and the stab flank 132 of the box 116 may also be engaged when the positive-stop torque shoulder 118 becomes fully engaged. In other embodiments the stab flank 130 and the stab flank 132 may have an axial space there between, or may be configured similar to the various configurations of engaged threads as described with respect to FIGS. 5A-5D above.

The other step of threads 141, the small step 141, of the two-step wedge thread 110 of FIG. 7 is formed so that upon makeup, a clearance distance 134, in the axial direction, exists between the load flanks 138 and 140 of the pin 114 and box 116, respectively, and so that a clearance distance 136 also exists, in the axial direction, between the stab flanks 135 and 145 of the pin 114 and box 116, respectively. Thus, in this step the threads of the pin 114 are permitted to move or to "float" in the axial direction relative to the threads of the box 116.

An axially spaced gap 150 is formed between a nose 146 of the pin 114 and an interior diameter (ID) 148 of the box 116. Thus the nose 146 and the ID 148 do not form a positive-stop torque shoulder. A gap 152 is also formed at an internal interface 154 between the two, different diameter, steps of threads 141 and 142.

A small radial clearance distance may also be formed between roots 127, 131 and corresponding crests 129, 133 of the large step 142 of engaged threads 144 at makeup. Alternatively, the roots 127, 131 and crest 129, 133 may make surface-to-surface interference contact at makeup to facilitate sealing. Similarly, roots 137, 147 and corresponding crests 139, 149 of the small step 141 of floating wedge threads 144 may make surface-to-surface interference contact upon makeup. Alternatively, to facilitate relative movement or "floating" between the pin and the box in the area of the floating threads 144, a slight radial clearance may be formed between the roots 137, 147 and the corresponding crest 139, 149 of the floating wedge threads 143.

While the step of engaged wedge threads 144 is shown as having a larger diameter than the step of floating wedge threads 143, it will be understood, for example with reference to FIGS. 3 and 4 above, that in alternative embodiments, the smaller diameter threads could be engaged threads, formed to engage against a positive torque stop, and the larger diameter step of threads could be floating wedge threads, formed with clearance between both of the load and stab flanks at makeup. Moreover, the floating wedge threads may be formed with various other configurations similar to those described with respect to FIGS. 6A-6D above.

In FIG. 8 a positive-stop torque shoulder 210 is formed between a tubular pin member 214 and a tubular box member 216 at an interface 211 between two steps of a two-step threaded connection 212. In this embodiment, engaged threads 218 are depicted as relatively smaller diameter threads and floating threads 220 are depicted as relatively larger diameter threads. In an alternative embodiment, the floating threads could be a relatively smaller diameter and the engaged threads could be relatively larger diameter. An axial gap 222 is formed between the base 224 of the box 216 and the OD 226 of the pin 214. An axial gap 228 is also formed between the nose 230 of the pin 214 and the ID 232 of the box 216.

In the alternative embodiment shown in FIG. 9, a two-step wedge thread connection 234 is depicted between a pin 236 and a box 238. A positive torque stop is formed, albeit not specifically with a positive-stop torque shoulder, by surface-to-surface mating engagement of both load flanks 258, 260 and stab flanks 262, 264 of one step 240 of the two-step wedge thread connection 234. Upon the application of a selected makeup torque, engaged wedge threads 241 in step 240 are forcibly engaged at the stab and load flanks and thereby fix the relative axial position of the pin 236 and the box 238. The other step of threads 242 are floating wedge threads 243 that are positioned at makeup with axial clearance between the load flanks 270, 268 and the stab flanks 274, 272 forming floating wedged threads 243. An axial gap 244 is formed between a box base 250 and a pin OD 252. An axial gap 246 is formed between at an internal interface 244 between the step 240 of the engaged wedge threads 241 and the step 242 of floating wedge threads 243. An axial gap 248 is formed between the pin nose 254 box ID 256.

The engaged threads 241 of the pin 236 and the box 238 make up into complete wedged engagement between the load flanks 258 and 260 and the stab flanks 262 and 264 to form a surface-to-surface seal between the respectively engaged load flanks and the respectively engaged stab flanks. In one embodiment the roots 261 and 263 and crests 265 and 267 of the engaged threads 241 also make surface-to-surface contact to further facilitate sealing at makeup and may be referred to as a metal-to-metal seal. This structure provides a positive torque stop that effectively acts like a positive-stop torque shoulder in other embodiments because it as it performs the same function with metal-to-metal contact between the load and stab flank surfaces.

Sealing can be further facilitated, according to other embodiments, by forming traditional metal-to-metal seals at either end of the treaded connection or at the internal interface 246 between the two steps of the treaded connection so that additional metal-to-metal sealing is provided simultaneously with the reaching makeup engagement of engaged threads at a positive torque stop. For example, such a metal-to-metal seal might be made with a small angled taper so that it does not provide a positive stop. The positive stop would instead be provided, for example, by positive stopping engagement of the load flanks and the stab flanks of the engaged wedge threads 241.

Thus, what has been described in various embodiments includes a two-step wedge thread design. At make-up, one step will be forcibly engaged, for example, with the load flanks pushing together opposing surfaces of a positive-stop torque shoulder, and the other step will have clearance at both the stab and the load flanks (the "floating wedge threads"). The amount of deformation of the positive-stop torque shoulder at makeup will be less than the elastic deformation limit of the material of the positive-stop torque shoulder (no plastic deformation). The clearance distance between the stab flanks and between the load flanks in the floating wedge threads will be small. The clearance will be less than an additional amount of deformation that would be required to reach the elastic limit of the positive-stop torque shoulder. Thus, when additional compression forces are applied to the connected tubular members, the total elastic deformation limit of the positive-stop torque shoulder will not be exceeded before the stab flanks of the floating wedge threads begin to carry the additional forces. In one embodiment the clearance is also less than the make-up deformation of the positive-stop torque shoulder so that contact at the positive-stop torque shoulder will not be released before the load flanks of the floating wedge threads begin to carry added load forces. With appropriate clearance at both the stab and the load flanks of the floating wedge threads, tension or compression, and tension and compression simultaneously as might occur during bending, can be handled without exceeding the elastic limit and without loosing contact at the positive-stop torque shoulder.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tubular connection comprising:
    a pin member having a first external thread in an engaged step of the pin member and a second external wedge thread in a floating step of the pin member, the first external thread having load flanks, stab flanks, roots, and crests, and the second external thread having load flanks, stab flanks, roots and crests;
    a box member having a first internal thread having in an engaged step of the box member and a second internal wedge thread in a floating step of the box member, the first external thread having load flanks, stab flanks, roots, and crests, and the second internal wedge thread having load flanks, stab flanks, roots, and crests; and
    wherein, there exists at least one selected clearance between the load flanks and stab flanks of the second external wedge thread and corresponding stab flanks and load flanks of the second internal wedge threads upon makeup of the connection, the at least one selected clearance being selected according to elastic deformation at makeup and the elastic deformation limit of at least one material of the tubular connection at makeup;
    a positive-stop torque shoulder having an elastic deformation limit, and wherein:
    the positive-stop torque shoulder is engage at makeup, and an initial makeup location is determined by deformation of the load flanks in the engaged step and deformation of opposed surfaces of the positive-stop torque shoulder at makeup; and
    the clearance between the stab flanks in the floating step plus the deformation of the positive-stop torque shoulder at makeup is no greater than the elastic deformation limit of the positive-stop torque shoulder.

2. The tubular connection of claim 1, wherein the clearance distance between the stab flanks in the floating step is formed at a selected location established by application of a selected makeup torque to maintain deformation of the positive-stop torque shoulder within a range of elastic deformation for a material of the positive-stop torque shoulder.

3. The threaded tubular connection of claim 1, wherein:
the load flanks in the engaged step have an elastic deformation limit; and
the clearance between the load flanks in the floating step plus the deformation of the load flanks in the engaged step at makeup is no greater than the elastic deformation limit of the load flanks of the first thread.

4. The tubular connection of claim 1, wherein:
the load flanks in the engaged step have an elastic deformation limit;
the load flanks in the engaged step engage and the opposed surfaces of the positive-stop torque shoulder engage at makeup, the initial makeup location being determined by deformation of the load flanks in the engaged step at makeup and deformation of the positive-stop torque shoulder at makeup; and
the clearance between the load flanks in the floating step makeup the deformation of the load flanks in the engaged step at makeup is less than the elastic deformation limit of the load flanks in the engaged step.

5. The threaded tubular connection of claim 1, wherein:
an initial makeup location is determined by deformation of the load flanks in the engaged step at makeup and deformation of the positive-stop torque shoulder at makeup;
the deformation of the positive-stop torque shoulder at makeup being no greater than the elastic limit of the positive-stop torque shoulder; and
the clearance between the load flanks of the floating step is no greater than the deformation of the positive-stop torque shoulder at makeup.

6. The tubular connection of claim 1, wherein a metal-to-metal seal exists at either end or in the middle of the connection.

7. The tubular connection of claim 1, further comprising:
the positive-stop torque shoulder is positioned for positive-stop torque shoulder deformation at makeup of the engaged step; and
wherein the clearance between the stab flanks in the floating step is selected to maintain the positive-stop torque shoulder deformation in a range of elastic deformation for a material of the positive-stop torque shoulder.

8. The tubular connection of claim 7, wherein the clearance distance between the stab flanks of the floating step is selected to be added with the initial deformation of the positive-stop torque shoulder to produce a sum that is no greater than the elastic limit of the positive-stop torque shoulder, so that the stab flanks in the floating step will engage to support a compression working force before the elastic deformation limit of the positive-stop torque shoulder is exceeded, thereby maintaining the deformation of the positive-stop torque shoulder in a range of elastic deformation.

9. The tubular connection of claim 1, further comprising:
the positive-stop torque shoulder positioned for elastic deformation of the positive-stop torque shoulder at makeup of the engaged step of the connection; and
wherein the clearance between the load flanks in the floating step is selected to maintain the deformation of the positive-stop torque shoulder in a range of elastic deformation for a material of the positive-stop torque shoulder.

10. The tubular connection of claim 9, wherein the clearance distance between the load flanks in the floating step is selected to be no greater than the elastic deformation of the positive-stop torque shoulder at makeup, so that the load flanks in the floating step engage to support a tension working load before the elastic deformation of the positive-stop torque shoulder is released, thereby maintaining the positive-stop torque shoulder compressed in the range of elastic deformation for the material of the positive-stop torque shoulder.

11. The tubular connection of claim 1, further comprising:
the positive-stop torque shoulder positioned so that the load flanks in the engaged step deform at makeup of the connection; and
wherein the clearance between the load flanks in the floating step is selected to maintain deformation of the engaged load flanks within a range of elastic deformation for a material of the engaged load flanks.

12. The tubular connection of claim 1, wherein:
the engaged step comprises engaged wedge threads, and the load flanks in the engaged wedge threads having an elastic deformation limit;
an initial makeup location is determined by makeup of the stab and load flanks of the engaged wedge threads at a selected makeup torque; and
the clearance between the load flanks in the floating wedge step at makeup and the clearance between the stab flanks in the floating wedge thread at makeup are selected so that the deformation of the load flanks in the engaged step plus the clearance between the load flanks in the floating wedge step is within an elastic range for the engaged wedge threads and so that the deformation of the stab flanks in the engaged step plus the clearance between the stab flanks in the floating wedge step is within an elastic range for the stab flanks of the engaged wedge threads.

13. The tubular connection of claim 1, wherein:
the engaged step comprises engaged wedge threads and the stab flanks in the engaged step have an elastic deformation limit;
an initial makeup location is determined by makeup of the stab and load flanks at a selected makeup torque; and
a total of the clearance on the stab flanks of the floating step plus the makeup deformation of the stab flanks of the engaged step is no greater than the elastic deformation limit of the stab flanks of the engaged step.

14. The tubular connection of claim 1, wherein:
the engaged step comprises engaged wedge threads, and the load flanks in the engaged wedge threads having an elastic deformation limit;
an initial makeup location is determined by makeup of the stab and load flanks of the engaged wedge threads at a selected makeup torque; and
the clearance between the load flanks in the floating wedge step at makeup plus the makeup deformation of the load flanks of the engaged wedge threads is no greater than the elastic deformation limit of the load flanks of the engaged wedge threads.

15. The tubular connection of claim 1, wherein:
the engaged step comprises a load flank and an initial makeup location is determined by initial deformation of the positive-stop torque shoulder at makeup; and
the clearance on the load flanks of the floating wedge thread is no greater than the makeup deformation of the positive-stop torque shoulder.

16. The tubular connection of claim 1, wherein:
the pin member has an outer diameter shoulder;
the box member has a face; and the positive stop torque shoulder is located at an interface of the box face and the pin outer diameter shoulder.

17. The tubular connection of claim 1, wherein:
the pin member has a nose;
the box member has an inner diameter shoulder; and
the positive-stop torque shoulder is located at an interface of the pin nose and the box inner diameter shoulder.

18. The tubular connection of claim 1, wherein:
the positive-stop torque shoulder is located at an interface of the pin member and box members between the engaged step and the floating step.

19. The threaded connection of claim 1, wherein the first and second external and internal threads have a generally rectangular shaped cross section.

20. The threaded connection of claim 1, wherein the first and second external and internal threads have a generally dovetail shaped cross section.

21. The threaded connection of claim 1, wherein the first and second external and internal threads have a generally hook shaped cross section.

22. The threaded connection of claim 1, wherein the internal thread of the box member comprises a tapered thread and the external thread of the pin member comprises a correspondingly tapered thread.

23. A tubular connection comprising:
a first thread in a first step having an initial makeup location;
a second thread in a second step, the second thread being a wedge thread, and having at least one selected clearance on stab and load flanks at the initial makeup location of the first thread, the at least one selected clearance being selected according to elastic deformation of at least one material of the tubular connection at makeup and an elastic deformation limit of the at least one material of the tubular connection; and
opposed load flanks on the first thread and a positive-stop torque shoulder with opposed surfaces having an elastic deformation limit;
wherein the opposed load flanks on the first thread will engage and the opposed surfaces of the positive-stop torque shoulder will engage at makeup, the initial makeup location being determined by deformation of the first thread load flanks and deformation of the positive-stop torque shoulder at makeup; and
wherein the clearance between the stab flanks of the second wedge thread plus the deformation of the positive-stop torque shoulder at makeup is no greater than the elastic deformation limit of the positive-stop torque shoulder.

24. The tubular connection of claim 23, wherein the clearance distance between the stab flanks of the second thread is formed at a selected location established by application of a selected makeup torque to maintain positive-stop torque shoulder deformation in a range of elastic deformation for a material of the positive-stop torque shoulder.

25. The threaded tubular connection of claim 23, wherein:
the load flanks of the first thread have an elastic deformation limit; and
the clearance between the load flanks of the second wedge thread plus the deformation of the first thread load flank at makeup is less than the elastic deformation limit of the load flanks of the first thread.

26. The threaded tubular connection of claim 23, wherein:
the stab flanks of the first thread have an elastic deformation limit; and
the clearance between the stab flanks of the second wedge thread plus the deformation of the stab flanks of the first thread at makeup is less than the elastic deformation limit of the stab flanks of the first thread.

27. The threaded tubular connection of claim 23, wherein:
the clearance between the load flanks in the second step and the clearance between the stab flanks in the second step are selected to maintain the clearance between the load flanks of the second step plus the deformation of the load flanks in the first step at makeup within a range of elastic deformation for the materials of load flanks, and to maintain the clearance of the stab flanks in the second step plus the deformation of the stab flanks in the first step within a range of elastic deformation for the stab flanks in the first step.

28. The tubular connection of claim 23, wherein a metal-to-metal seal exists at either end or in the middle of the connection.

29. The tubular connection of claim 23, wherein the positive-stop torque shoulder exists at either end or in the middle of the connection.

30. A two-step threaded tubular connection comprising:
a pin member having a first and a second external thread increasing in width in one direction, the first external thread having a diameter smaller than the second external thread and the first and second external threads comprising first and second external load and stab flanks;
a box member having a first and a second internal thread increasing in width in the other direction proportional to the increase in width of the external threads so that complementary first and second internal and external threads move toward engagement upon makeup of the connection, the first internal thread having a diameter smaller than the second internal thread and the first and second internal threads comprising first and second internal load and stab flanks;
a positive-stop torque shoulder having a predetermined elasticity permitting a predetermined axial compression distance upon makeup at a predetermined torque; and
wherein the widths of the second internal and external threads are selected to provide a selected load flank clearance distance between the second internal load flanks and the second external load flanks and to provide a selected stab flank clearance distance between the second internal stab flanks and second external stab flanks, wherein the selected load flank clearance distance is no greater than the predetermined axial compression of the positive-stop torque shoulder upon final makeup of the connection at the predetermined torque and the selected stab flank clearance distance plus the predetermined axial compression of the positive-stop torque shoulder upon final makeup is no greater than the elastic deformation limit of the positive-stop torque shoulder.

31. The threaded connection of claim 30 wherein the first and second external and internal threads have a rectangular shaped cross section.

32. The threaded connection of claim 30 wherein the first and second external and internal threads have a dovetail shaped cross section.

33. The threaded connection of claim 30 wherein the first and second external and internal threads have a hook shaped cross section.

34. The threaded connection of claim 30, wherein the internal thread of the box member comprises a tapered thread and the external thread of the pin member comprises a correspondingly tapered thread.

35. A two-step threaded tubular connection comprising:

a pin member having a first and a second external thread increasing in width in one direction, the first external thread having a diameter smaller than the second external thread and the first and second external threads comprising first and second external load and stab flanks;

a box member having a first and a second internal thread increasing in width in the other direction proportional to the increase in width of the external threads so that complementary first and second internal and external threads move toward engagement upon makeup of the connection, the first internal thread having a diameter smaller than the second internal thread and the first and second internal threads comprising first and second internal load and stab flanks;

a positive-stop torque shoulder having an elastic deformation limit and permitting a predetermined axial compression distance that is less than one-half of the elastic deformation limit of the positive-stop torque shoulder upon makeup at a predetermined torque; and wherein the width of the first internal thread and external thread are selected to provide selected clearance distances between both the first internal load and stab flanks and the first external load and stab flanks, wherein the selected clearance distances are less than one-half the predetermined axial compression upon final makeup of the connection at the predetermined torque.

36. A method of making a tubular connection comprising:

rotationally engaging a pin member, the pin having a first external wedge thread in an engaged step of the pin member and a second external wedge thread in a floating step of the pin member, the first external thread having load flanks, stab flanks, roots, and crests, and the second external thread having load flanks, stab flanks, roots and crests, together with a box member, the box member having a first internal wedge thread in an engaged step of the box member and a second internal wedge thread in a floating step of the box member, the first internal thread having load flanks, stab flanks, roots, and crests, and the second internal thread having load flanks, stab flanks, roots and crests; and wherein, there exists at least one selected clearance between the load flanks and stab flanks of the second external wedge thread and corresponding stab flanks and load flanks of the second internal wedge threads upon makeup of the connection at the first external and internal wedge threads, the at least one selected clearance being selected according to elastic deformation of at least one material of the tubular connection at makeup.

* * * * *

UNITED STATES PATENT AND TRADEMARK OFFICE
CERTIFICATE OF CORRECTION

| | | |
|---|---|---|
| PATENT NO. | : 7,527,304 B2 | Page 1 of 1 |
| APPLICATION NO. | : 11/027015 | |
| DATED | : May 5, 2009 | |
| INVENTOR(S) | : David Llewellyn Mallis et al. | |

It is certified that error appears in the above-identified patent and that said Letters Patent is hereby corrected as shown below:

In Claim 4, column 17, line 24, "makeup" should read --plus--.

Signed and Sealed this

Thirtieth Day of June, 2009

JOHN DOLL
*Acting Director of the United States Patent and Trademark Office*